United States Patent
Levisohn et al.

(10) Patent No.: US 11,156,445 B2
(45) Date of Patent: Oct. 26, 2021

(54) TAPE MEASURE

(71) Applicant: ParcelTools Pty Limited, Rydalmere (AU)

(72) Inventors: John Levisohn, Rydalmere (AU); Tony Bauer, Rydalmere (AU)

(73) Assignee: ParcelTools Pty Limited

( * ) Notice: Subject to any disclaimer, the term of this patent is extended or adjusted under 35 U.S.C. 154(b) by 94 days.

(21) Appl. No.: 16/281,219

(22) Filed: Feb. 21, 2019

(65) Prior Publication Data
US 2019/0257633 A1    Aug. 22, 2019

(51) Int. Cl.
| | |
|---|---|
| *G01B 3/1061* | (2020.01) |
| *G06F 9/30* | (2018.01) |
| *G01D 5/347* | (2006.01) |
| *G06K 19/06* | (2006.01) |
| *G01B 3/1003* | (2020.01) |

(Continued)

(52) U.S. Cl.
CPC ......... *G01B 3/1061* (2013.01); *G01B 3/1003* (2020.01); *G01D 5/34715* (2013.01); *G01D 5/34746* (2013.01); *G06F 9/30007* (2013.01); *G06K 19/06028* (2013.01); *G06K 19/06046* (2013.01); *G01B 3/1069* (2020.01); *G01B 2003/1033* (2013.01)

(58) Field of Classification Search
CPC .......... G01B 2003/1033; G01B 3/1003; G01B 3/1061; G01B 3/1069
USPC .......................................................... 33/707
See application file for complete search history.

(56) References Cited

U.S. PATENT DOCUMENTS

| | | | | |
|---|---|---|---|---|
| 4,189,107 A | * | 2/1980 | Quenot | G01B 3/1005 242/390.1 |
| 4,551,847 A | * | 11/1985 | Caldwell | G01D 5/363 377/24 |

(Continued)

OTHER PUBLICATIONS

Parcel Tools Pty Ltd, Cubetape C190POS Quickstart Guide, Undated, Version 1.0.1.

(Continued)

*Primary Examiner* — Yaritza Guadalupe-McCall
(74) *Attorney, Agent, or Firm* — Skinner and Associates; Joel D. Skinner, Jr.

(57) ABSTRACT

A device for measuring length of an object, comprising a coilable tape having a plurality of machine-readable measurement codes on at least one surface, each of the plurality of machine-readable measurement codes encoding for a length value corresponding to a length, a scan engine having a reading zone through which the coilable tape can be extended, the scan engine being configured to detect a machine-readable measurement code positioned within a reading zone, a processor in communication with the scan engine, and an output means selected from one or more of a visual display, a wireless transmitter, a memory, and a remote device, wherein upon extending the coilable tape to a particular length, such that the machine-readable measurement code encoding for the corresponding length value is positioned within the reading zone, the scan engine detects the machine-readable measurement code, receives the corresponding length value and provides the corresponding length value to the processor, the processor processes the corresponding length value, and provides the processed length value to the output means.

14 Claims, 3 Drawing Sheets

(51) Int. Cl.
  *G01B 3/1005* (2020.01)
  *G01B 3/1069* (2020.01)

(56) References Cited

U.S. PATENT DOCUMENTS

| | | | | |
|---|---|---|---|---|
| 4,896,280 | A * | 1/1990 | Phillips | G01B 11/02 702/164 |
| 5,027,526 | A * | 7/1991 | Crane | G01B 3/1061 33/763 |
| 5,142,793 | A * | 9/1992 | Crane | G01B 3/1061 33/763 |
| 5,386,643 | A * | 2/1995 | Corcoran | G01B 3/1061 33/762 |
| 5,426,863 | A * | 6/1995 | Biggel | G01B 3/1061 33/763 |
| 5,983,514 | A * | 11/1999 | Lindsey | G01B 3/1061 33/760 |
| 6,868,571 | B1 * | 3/2005 | Fischer | B25H 7/04 33/760 |
| 7,370,433 | B1 * | 5/2008 | Caraway | G01B 3/1084 33/768 |
| 8,356,419 | B2 * | 1/2013 | Lord | G01B 3/11 33/756 |
| 10,859,363 | B2 * | 12/2020 | Murray | G01B 3/1061 |
| 2004/0211074 | A1 * | 10/2004 | Tessel | B44D 3/38 33/414 |
| 2008/0276477 | A1 * | 11/2008 | Albrecht | G01B 3/1003 33/707 |
| 2009/0307920 | A1 * | 12/2009 | Schrage | G01B 3/1041 33/760 |
| 2019/0257633 | A1 * | 8/2019 | Levisohn | G06K 19/06046 |
| 2020/0080827 | A1 * | 3/2020 | Eun | G01D 18/00 |

OTHER PUBLICATIONS

Parcel Tools Pty Ltd, Cubetape C190POS User Guide, 2020, Version 1.0.1.
Parcel Tools Pty Ltd, Cubetape PRO Quickstart Guide, Undated.
Parcel Tools Pty Ltd, Cubetape PRO Technical Manual, May 2019.

* cited by examiner

TAPE MEASURE

PRIORITY APPLICATION

The present application claims priority from Australian provisional patent application No. 4 filed on 21 Feb. 2018, the entirety of which is incorporated herein by reference.

TECHNICAL FIELD

The invention relates to tape measures and more particularly to a tape measure having machine-readable code or other symbols imprinted on one side of the tape.

BACKGROUND

One type of measuring tape is a flexible ruler used to measure distance. Many tape measures use a coiled metal tape in a case. A common steel tape is imprinted with roman numerals and fractional or decimal sub-divisions that can be read directly by a user. However, in some situations such as in parcel and mail transport, a user must make, operate with and record many readings per hour. Users may require the acquired distance information to be presented in distinctly different units of measure, or with a selected rounding error margin. The user may want to more easily manipulate and transmit the distance information. The user will typically utilise the numerical data obtained from a visual reading of the tape to perform calculations such parcel size and parcel volume. The user may want to know, in the future, which device made the measurement.

Accordingly, it would be an advantage to provide a tape measure that resembled a conventional tape measure to the user but that could obtain accurate measurements by reading them directly from the tape, record and store those measurements, manipulate those measurements for a number of useful purposes, display as well as communicate user selectable data wirelessly with an external computer application, server or remote device.

SUMMARY OF THE INVENTION

It is an object of the invention in one form to provide a hand held tape measure having an optional internal scanner that co-operates with machine-readable codes that are imprinted on one side of its tape.

In preferred embodiments, a curved code is imprinted on one side of the tape and human readable numerals are printed on the other side of the tape. In some embodiments of the invention, the code printed on the tape is a curved code on a transversely curved tape. In some embodiments, the device has a handle and optional trigger. In other embodiments of the invention, the reader comprises a scan engine having an optical window that illuminates the tape at an optimised, non-vertical, scan-angle.

In further embodiments, the tape measure's processor records data provided by the scan engine, processes it and transmits wirelessly to a remote device. The remote device or app may use the data for a variety of purposes including calculations, identification of the sending device, costing, calculations, logistical decisions, displays and alerts.

Accordingly, there is provided a tape measure having an internal scan engine and an optional exterior scan window. The tape measure has a coilable tape, preferably a tape that is rigid when extended such as a steel tape. The tape is imprinted on one side with machine-readable codes and imprinted on the other side with optional human readable numerals. Like its conventional counterpart, the tape is curved transversely, forming a "U" shaped trough along its length as it is extended from the coil. The device collects, processes, displays and transmits data from the scan engine but also has a view window through which the human readable numerals may be seen. The device may be programmed by reading machine-readable instruction codes.

In an embodiment, the present invention may comprise a device for measuring length of an object, comprising a coilable tape having a plurality of machine-readable measurement codes on at least one surface, each of the plurality of machine-readable measurement codes encoding for a length value corresponding to a length, a scan engine having a reading zone through which the coilable tape can be extended, the scan engine being configured to detect a machine-readable measurement code positioned within a reading zone, a processor in communication with the scan engine, and an output means selected from one or more of a visual display, a wireless transmitter, a memory, and a remote device, wherein upon extending the coilable tape to a particular length, such that the machine-readable measurement code encoding for the corresponding length value is positioned within the reading zone, the scan engine detects the machine-readable measurement code, receives the corresponding length value and provides the corresponding length value to the processor, the processor processes the corresponding length value, and provides the processed length value to the output means. In an embodiment, processing of the received corresponding length value may comprise converting the corresponding length value to a specified length unit.

In an embodiment, the detection of the machine-readable measurement code by the scan engine is automatic. In an embodiment, the measurement device may further comprise one of an exterior button, a switch and a control, actuation of which causes the scan engine to detect the machine-readable measurement code positioned within the reading zone.

In an embodiment, the processing of the received corresponding length value is configurable by providing a processing instruction to the processor, and the scan engine is further configured to detect a machine-readable instruction code corresponding to the processing instruction. In an embodiment, the processing instruction comprises at least one of: an instruction to convert the corresponding length value to a specified length unit; an instruction to convert the corresponding length value to a specified rounding increment; an instruction to associate the corresponding length value with a dimension characteristic; an instruction to associate the corresponding length value with an identifying code that identifies one or more of the object being measured, an identity of the device, and an identity of a device user; and an instruction to stop a previously-received instruction.

In an embodiment, the coilable tape further comprises human-readable measurement numerals on at least one surface.

In an embodiment, the scan engine is contained within a scanning unit that is detachable from the device. In a further embodiment, the scanning unit further contains the processor. In a further embodiment, the scanning unit further contains the output means.

BRIEF DESCRIPTION OF THE FIGURES

In order that the invention be better understood, reference is now made to the following figures in which.

DETAILED DESCRIPTION OF A PREFERRED EMBODIMENT

Figure 1:
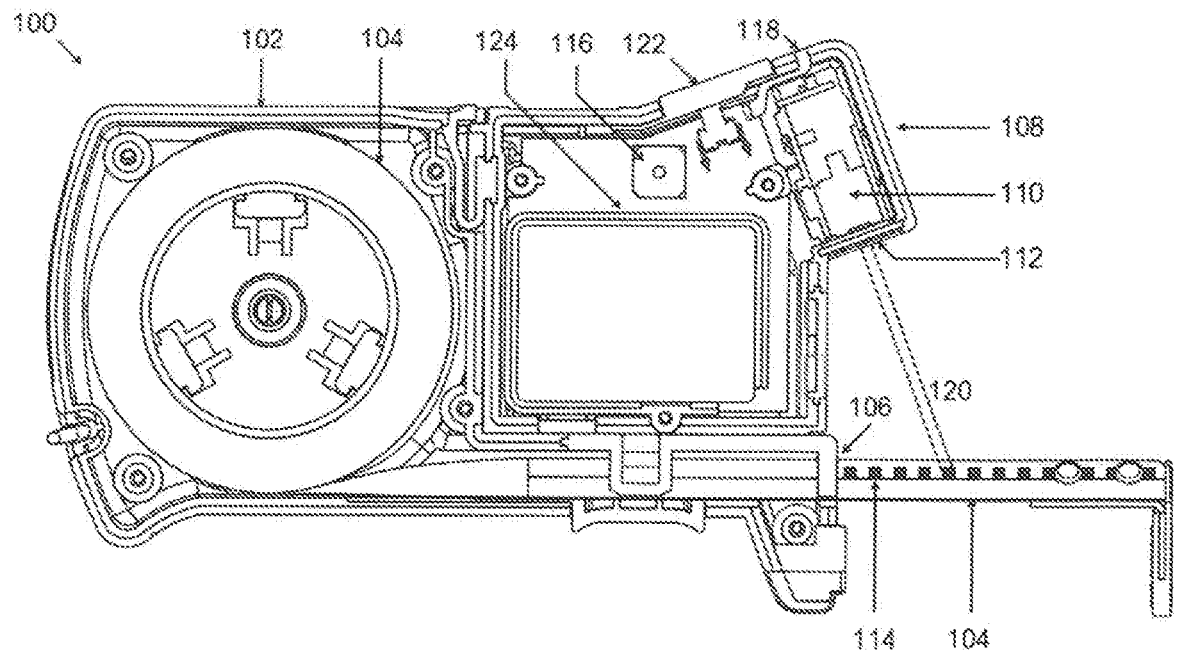
FIG. 1 is a side elevation of a tape measure.

In a first aspect and with reference to FIG. 1, there is shown a measuring device 100 for measuring the length of an object. In at least one embodiment, the measuring device 100 comprises a case 102 containing a coilable tape 104. The tape exits the case 102 through a slot 106 located on a forward face of the case 102.

Located above the slot is a projecting part 108 containing a scanning engine 110 110. An underside of the projecting part 108 has a transparent scan window 112 through which the scanning engine 110 can detect the machine-readable measurement code 114 of the coilable tape 104.

The surface of the tape has a plurality of machine-readable measurement codes 114 located on at least one surface. Each of the plurality of machine-readable measurement codes 114 encodes for a length value corresponding to a length. Each of the plurality of machine-readable measurement codes 114 corresponds to a different length. In general, the length value encoded for by a particular machine-readable measurement code 114 will correspond to a length between a first and second point on the coilable tape 104. In at least one exemplary embodiment, the first point may be located on or proximal to an end of the coilable tape 104.

In at least the present embodiment, the machine-readable measurement codes 114 are located in sequence along the longitudinal axis of the coilable tape 104 so that only one machine-readable measurement code 114 can be scanned by the scan engine 110. Each machine-readable measurement code 114 is unique and contains dimensional information. By scanning, reading and decoding the encoded data, the scan engine 110 and processor 116 are able to interpret the extension of the coilable tape 104. The data or decoded data may be stored, manipulated or output so as to indicate a measured dimension to the user. In a further embodiment the coilable tape 104 also has human-readable numbers corresponding to length.

The measuring device 100 further comprises a processor 116 in communication with the scan engine 110, and an output means 118 selected from one or more of a visual display, a wireless transmitter, a memory, and a remote device 100 (represented in FIG. 1 as a visual display). The output means 118 may also include a wireless transceiver such as Bluetooth, NFC or WIFI that can broadcast and receive wireless information.

In one exemplary embodiment, The scan engine 110 is arranged to have a reading zone 120 through which the coilable tape 104 is able to extend. The scan engine 110 is configured to detect the machine-readable measurement code 114 located upon the upper surface of the coilable tape 104 when it is located within the reading zone 120. Upon detection of a particular machine-readable measurement code 114, the scan engine 110 provides a signal corresponding to the encoded length value to the measuring device 100's processor 116. The processor 116 then processes the corresponding signal to produce a processed length value. The step of processing may comprise at least rendering the signal into a suitable form for providing to the output means 118.

In an embodiment, the reading zone 120 may extend outwardly at an angle from the device 100. The angle of the reading zone 120 relative to the front of the device 100 may be between 1°—20°. In one preferred embodiment, the angle of the reading zone 120 relative to the front of the device 100 may be between 10°—20°. In a further preferred embodiment, the angle of the reading zone 120 may be 17°.

In at least one embodiment, processing of the corresponding signal may comprise the step of converting the corresponding length value to a specified length unit. The specified length unit may be inches, feet, yards, metres, centimetres, millimetres, or any other appropriate unit of length. As the skilled person will appreciate, selection of a unit of length other than the non-exhaustive example list previously given does not depart from the scope of the invention.

Figure 2:
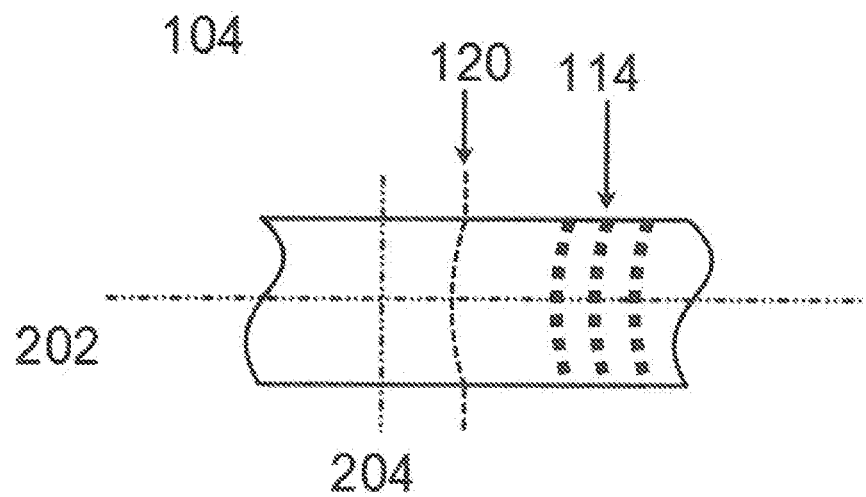
FIG. 2 is a plan view and a transverse cross-section of a curved tape.

FIG. 2 depicts a section of the coilable tape 104. With reference thereto, an embodiment of the coilable tape 104 may have a longitudinal or long axis 202 and a transverse or short axis 204. The coilable tape 104 may be curved along the short axis when it is extended, which may provide rigidity. In this example, the upper side of the coilable tape 104 is pre-imprinted with a sequence of machine-readable measurement codes 114. Although only three instances of the machine-readable measurement code 114 are shown so as to not obscure the features of the figure, the skilled person will appreciate that the machine-readable measurement codes 114 extend along a substantial portion of the length of the coilable tape 104, such that the particular code within the reading zone 120 will be detected by the scan engine 110. In an embodiment, the machine-readable measurement codes 114 printed across the short axis may not be straight or rectangular like conventional code; the codes may be curved so as to conform or align with the reading zone 120 as it defines a plane that intersects the curved tape. The machine-readable measurement codes 114 may take the form of barcodes, QR codes, numeric strings or any other suitable form of machine-readable code.

Figure 3:
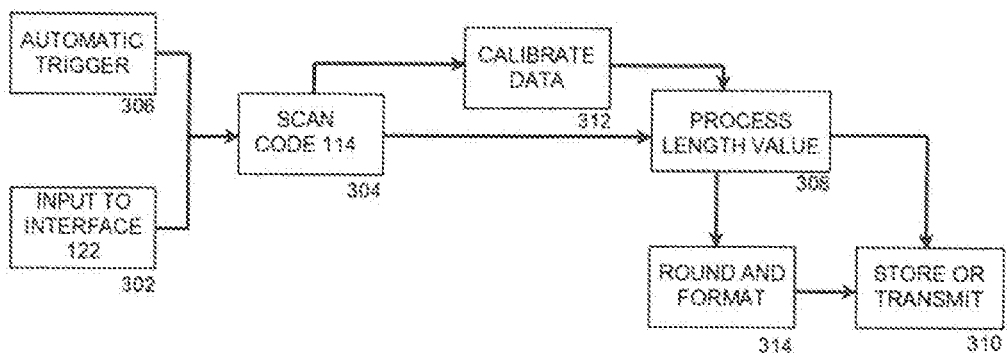
FIG. 3 is a flow chart illustrating the storage of measurement data in a tape measure with a scanner of an embodiment of the invention.

With reference to FIG. 1, in a further embodiment, the measurement device 100 may comprise a user interface 122. With reference to FIG. 3, the scan engine 110 may respond to an input 302 from a user interface 122 by scanning the coilable tape 104 (step 304). The user interface 122 may comprise at least one of an exterior button, a switch and a control. In an alternate embodiment, detection of the machine-readable measurement code 114 may be automatic, periodic or triggered by some alternate means 304. The scan data is at least temporarily stored in the memory of the processor 116 for processing. The processor 116 may then operate on or process the data (or calibrated data) through processing step 308. One example process may be performed by applying a divisor, for example a units divisor of 1, 10, or 25.4. In such an exemplary embodiment, the divisor may be used to convert the reading to another unit of measure to suit the user's requirement for displayed and recorded units of measure (millimetres, centimetres or inches etc.). After processing, the processed length value may be provided to an output means 118, such as a visual display, in storage/transmission step 310.

In further embodiments, after the scanning step 304 the user can use the inputs on the interface 122 (or remotely by app) to apply a calibration step 312 to the reading by software adjustments, in order to take into account any variations in the relative position of the tape with respect to the body or scan engine 110. As the skilled person will appreciate, the software based calibration step 312 is optional and may not be necessary for all embodiments of the invention.

In a further embodiment, the processed length value from processing step 308 may be rounded and formatted in a rounding step 314. The rounded and formatted data may then enter storage/transmission step 310.

In an embodiment and as depicted in FIG. 1, the tape measure device 100 may have a battery operated microcontroller 124 that receives signals from the scan engine 110. In some embodiments, the microcontroller may also receive signals and commands from the device 100's user interface 122. The microcontroller may also provide information and signals to the interface 122. In some embodiments, the microcontroller may also communicate with remote device 100s through the output means 118 such as a wireless interface 122 and may also have a physical e.g. USB interface 122 through which the device 100 can be interrogated, programmed or updated.

Figure 4:
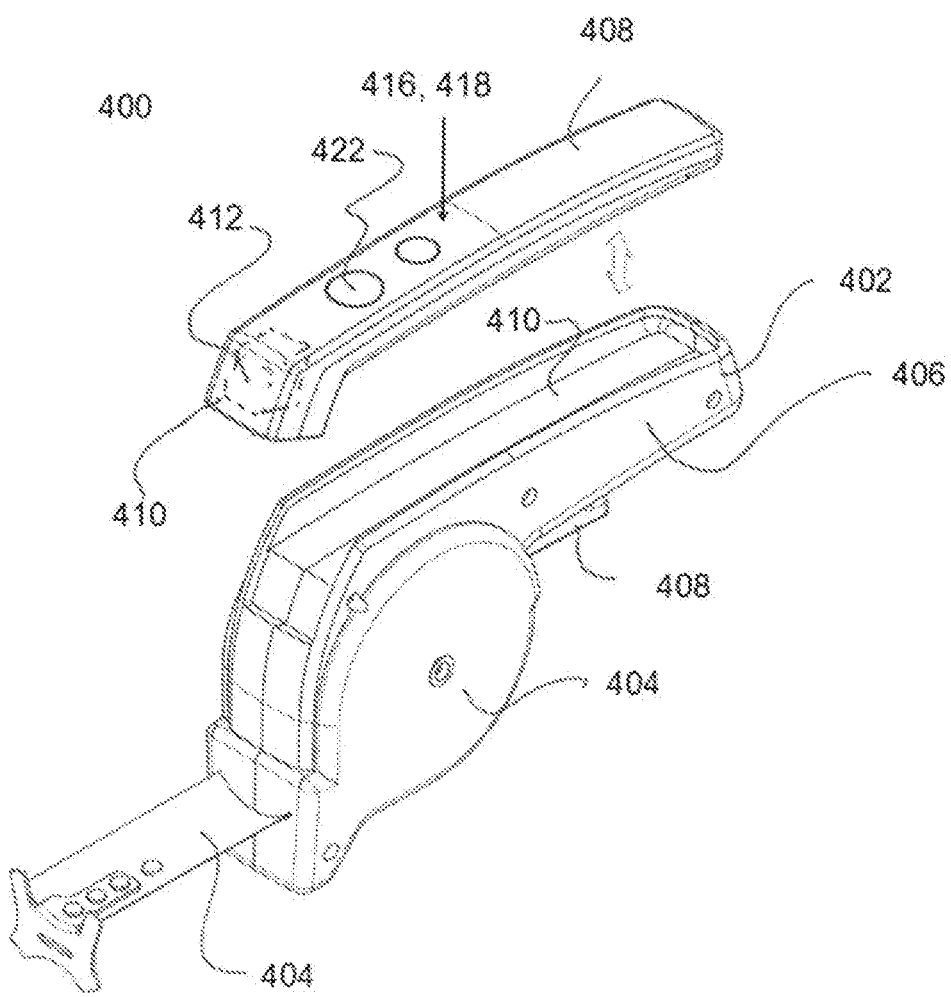
FIG. 4 is a partially exploded perspective view illustrating a modular embodiment of the invention.

A modular embodiment 400 of the invention is depicted in FIG. 4. As shown therein, a main case 402 has a portion adapted to contain a coiled measuring tape 404 and an integral handle 406. In an embodiment, the forward part of the handle 406 provides a location for an optional trigger or finger operated brake release 408. The reciprocating brake release normally presses against the coiled tape within the main body. When the trigger is depressed, a friction portion of the break is released from contact with the tape and the tape can move freely. The handle also incorporates a longitudinal recess 410 that is adapted to removably receive a scanning unit 410.

The scanning unit has a scanning engine 412, a user interface 422, batteries for power and may have a processor 416 for acquiring, storing, operating on and wirelessly communicating with other devices in conjunction with an output means 418. In this example, the scanning unit may be relatively flat but has a projecting portion for accommodating the scan engine and the scanning window below it. In preferred embodiments, the scanning unit snaps into the longitudinal recess 406 without tools and can be manually released. It is stably and reliably held by the channel during use.

In an alternate modular embodiment, the scanning unit 410 may be configured to be attached to a conventional tape measure.

The software and interface of the aforementioned devices allow the device to be used as a measuring device that can be programmed by scanning programming codes which instruct the firmware to provide the end user with appropriate units of measure, format, calibration and other options.

Figure 5:
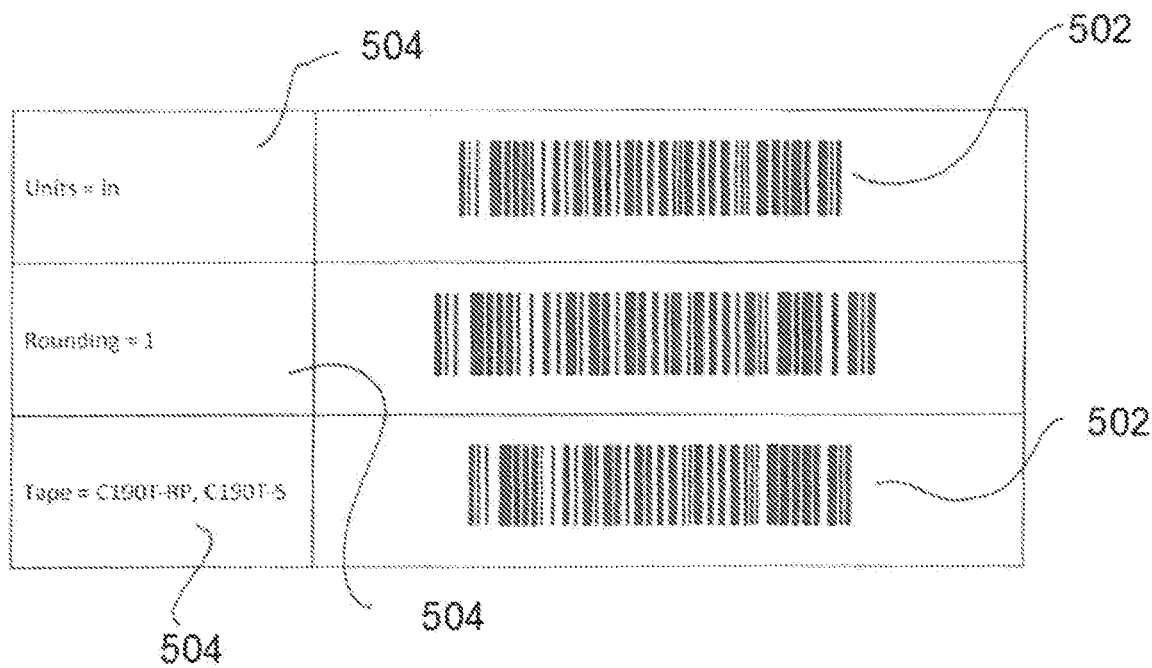
FIG. 5 illustrates a chart having separate columns for instructions and for machine-readable codes related to those instructions.

With reference to FIG. 5, in an embodiment the scan engine, may be able to detect machine-readable instruction code 502 which corresponds to at least one processing instruction 504. Thus, by scanning an machine-readable instruction code 502 the device may, for example, be made to operate in different units of measure, to operate with different increments of numeric rounding and even to cause the processor to associate each transmitted distance measurement with an identifier that provides a record of the identity of the device that made the measurement. The identification of the device can include brand, model number or other data. Thus, in a further embodiment, the device 100 may be able to be used both for measurements and as a general purpose or generic barcode reader. Dimensional data and generic or instruction data items are handled differently by software applications on the appropriate host computer or remote device that receives the signals from the subject scanner. Dimensions are inserted into specific application fields for example, length, width or height and general or machine-readable instruction code items are inserted into other software fields. The device can thus identify whether a detected machine-readable code relates to a dimension (i.e. machine-readable measurement code 114) or an instruction (i.e. machine-readable instruction code 502).

In some embodiments, the identification data may allow application software to determine the source of the data and to insert the appropriate data into the appropriate field, in some instances taking the identification data into account when providing a useful output to the end user. By identifying the particular device from which data originated, the user can access additional application control over the processing of data received from the device or communicate commands to a specific device. The device identification feature can be turned on or off (toggled) by scanning a machine-readable instruction code 502 associated with the identification field as suggested by FIG. 5. A number of machine-readable instruction codes 502 may be listed on a single sheet or sheets for the user's benefit.

While the invention has been described with reference to preferred embodiments above, it will be appreciated by those skilled in the art that it is not limited to those embodiments, but may be embodied in many other forms, variations and modifications other than those specifically described. The invention includes all such variation and modifications. The invention also includes all of the steps, features, components and/or devices referred to or indicated in the specification, individually or collectively and any and all combinations or any two or more of the steps or features.

In this specification, unless the context clearly indicates otherwise, the word "comprising" is not intended to have the exclusive meaning of the word such as "consisting only of", but rather has the non-exclusive meaning, in the sense of "including at least". The same applies, with corresponding grammatical changes, to other forms of the word such as "comprise", etc.

Other definitions for selected terms used herein may be found within the detailed description of the invention and apply throughout. Unless otherwise defined, all other scientific and technical terms used herein have the same meaning as commonly understood to one of ordinary skill in the art to which the invention belongs.

Although not required, the embodiments described with reference to a method, computer program, data signal and aspects of the system can be implemented via an application programming interface (API), an application development kit (ADK) or as a series of program libraries, for use by a developer, for the creation of software applications which are to be used on any one or more computing platforms or devices, such as a terminal or personal computer operating system or a portable computing device, such as a smartphone or a tablet computing system, operating system, or within a larger server structure, such as a 'data farm' or within a larger transaction processing system.

Generally, as program modules and/or processor instructions include routines, programs, objects, components and data files that perform or assist in the performance of particular functions, it will be understood that the functionality of the software application may be distributed across a number of routines, programs, objects or components to achieve the same functionality as the embodiment and the broader invention claimed herein. Such variations and modifications are within the purview of those skilled in the art.

Where reference is made to a processor interacting with a database and/or one or more other devices (such as an image capture device or scan engine), it will be appreciated that it is implied that the processor also has access to any components necessary to perform any aspect or method step of the invention as described and defined herein. That is, while not explicitly described, a person skilled in the art would understand that the processor would be required to interact with volatile memory (e.g. RAM), storage devices (e.g. hard drives), etc. in order to carry out certain well known operations, such as accessing a database, receiving input from a user, etc.

Any promises made in the present document should be understood to relate to some embodiments of the invention, and are not intended to be promises made about the invention in all embodiments. Where there are promises that are deemed to apply to all embodiments of the invention, the applicant/patentee reserves the right to later delete them from the description and they do not rely on these promises for the acceptance or subsequent grant of a patent in any country.

The invention claimed is:

1. A device for measuring length of an object, comprising:
   a casing that houses a coilable tape having a plurality of machine-readable measurement codes on at least one surface, each of the plurality of machine-readable measurement codes encoding for a length value corresponding to a length;
   a scanning unit that is reversibly mountable to a receiving portion of an external surface of the casing, the scanning unit housing a scan engine having a reading zone, the scan engine being configured to detect a machine-readable measurement code positioned within a reading zone;
   a processor in communication with the scan engine; and
   an output means selected from one or more of a visual display, a wireless transmitter, a memory, and a remote device;
   wherein the scanning unit is not connectible or attachable directly to teh coilable tape;
   wherein, when the scanning unit is mounted to the receiving portion, the reading zone extends outwardly at an angle from a portion of the casing from which the coilable tape extends, the angle falling between one and twenty degrees;
   wherein, upon extending a coilable tape and positioning the scanning unit at a particular length there along, such that the machine-readable measurement code encoding for the corresponding length value is positioned within the reading zone, the scan engine detects the machine-readable measurement code and provides a corresponding signal the to the processor;
   the processor processes said corresponding signal to produce a processed length value; and
   provides the processed length value to the output means.

2. The device of claim 1 wherein processing of the received corresponding length value comprises converting the corresponding length value to a specified length unit.

3. The device of claim 1 wherein the detection of the machine-readable measurement code by the scan engine is automatic.

4. The device of claim 1 further comprising one of an exterior button, a switch and a control, actuation of which causes the scan engine to detect the machine-readable measurement code positioned within the reading zone.

5. The device of claim 1, wherein the processing of the received corresponding length value is configured by providing a processing instruction to the processor; and
   the scan engine is further configured to detect a machine-readable instruction code corresponding to the processing instruction.

6. The device of claim 5 wherein the processing instruction comprises at least one of:
   an instruction to convert the corresponding length value to a specified length unit;
   an instruction to convert the corresponding length value to a specified rounding increment;
   an instruction to associate the corresponding length value with a dimension characteristic;
   an instruction to associate the corresponding length value with an identifying code that identifies one or more of the object being measured, an identity of the device, and an identity of a device user; and
   an instruction to stop a previously-received instruction.

7. The device of claim 1 wherein the scanning unit further contains the processor.

8. The device of claim 1 wherein the scanning unit further contains the processor.

9. The device of claim 1 wherein the scanning unit further contains the output means.

10. The device of claim 1, wherein:
    The receiving portion of the casing comprises a recess adapted to removably receive the scanning unit; and
    the reading zone of the scan engine is arranged such that, when the scanning unit is received within the recess of the casing, the coilable tape extends through the reading zone and the machine-readable measurement code thereupon is able to be detected by the scan engine.

11. The device of claim 1, further comprising a handle extending from the casing.

12. The device of claim 11, wherein:
    the handle comprises a brake trigger extending outwardly therefrom; and
    actuation of the brake trigger releases a brake from being applied to the coilable tape, such that said coilable tape can freely extend and/or retract.

13. The device of claim 1, wherein the scan engine and processor are further configured to detect and process barcodes.

14. The device of claim 1, wherein the scanning unit is configured to attach onto a casing of a conventional tape measure comprising a coilable tap with human-readable measurement markings thereupon, such that said coilable tape extends through the reading zone of the scan engine.

* * * * *